United States Patent
Komine et al.

(10) Patent No.: US 6,848,107 B1
(45) Date of Patent: Jan. 25, 2005

(54) MESSAGE CONTROL APPARATUS

(75) Inventors: Hiroaki Komine, Kanagawa (JP); Noriyuki Yokoshi, Kanagawa (JP); Kazuyoshi Karaki, Ishikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/328,369

(22) Filed: Jun. 9, 1999

(30) Foreign Application Priority Data

Nov. 18, 1998 (JP) .......................................... 10-328360

(51) Int. Cl.⁷ ............................................. G06F 9/44
(52) U.S. Cl. ..................... 719/314; 718/102; 718/103; 718/104; 718/105
(58) Field of Search .................. 709/1–8, 200–253; 719/311–318; 718/100–108

(56) References Cited

U.S. PATENT DOCUMENTS

| | | | |
|---|---|---|---|
| 5,752,031 A | * 5/1998 | Cutler et al. | 709/103 |
| 5,826,081 A | * 10/1998 | Zolnowsky | 709/103 |
| 5,828,881 A | * 10/1998 | Wang | 709/314 |
| 2001/0056457 A1 | * 12/2001 | Kikuchi et al. | 709/104 |

FOREIGN PATENT DOCUMENTS

| | | |
|---|---|---|
| JP | 7 501163 | 2/1993 |
| JP | 7-501163 | 2/1993 |
| JP | 9-69053 | 3/1997 |
| JP | 10-49381 | 2/1998 |
| JP | 10-55284 | 2/1998 |
| WO | 93/2414 | 2/1993 |

* cited by examiner

*Primary Examiner*—Meng-Al T. An
*Assistant Examiner*—Charles Anya
(74) *Attorney, Agent, or Firm*—Staas & Halsey LLP

(57) ABSTRACT

In a message control apparatus for transferring messages between objects which belong to different processes, a message distributor distributes messages to queue buffers provided for each of target objects, and a thread controller simultaneously prepares a plurality of threads less than a maximum thread allocation number predetermined for each of processes and the target objects and takes out the messages to be given to a corresponding target object. Also, the maximum thread allocation number corresponding to a CPU serviceability ratio in the processes can be designated, and a part of the thread allocation number of the target objects with few thread number used is allotted to the maximum thread allocation number of the target objects with many thread number used.

25 Claims, 20 Drawing Sheets

TO_1, TO_2, TO_3: TARGET OBJECT

TO_1, TO_2: TARGET OBJECT

TO_1, TO_2: TARGET OBJECT

TO_1, TO_2, TO_3: TARGET OBJECT

700 MESSAGE (REQUEST)

R: REQUEST NAME
x: REQUEST ARRIVAL ORDER
O: OPERATION NAME
p: OPERATION PRIORITY LEVEL

AFTER SORT

TO: TARGET OBJECT

AFTER SORT

TO: TARGET OBJECT

FIG.14A

| USER NAME (#User Name) | USER LEVEL (User Level) |
|---|---|
| Administrator | 1 |
| amelio | 2 |
| atari | 2 |
| okonomy | 2 |
| sussy | 2 |
| sundog | 2 |
| ……… | … |
| ……… | … |

FIG.14B

| REQUEST NAME (#Request Name) | PRIORITY LEVEL (Priority) | EXCLUSIVE CONTROL INFORMATION (Exclusive) |
|---|---|---|
| Create | 2 | OFF |
| Get | 3 | OFF |
| Set | 3 | OFF |
| Delete | 3 | OFF |
| Action | 1 | OFF |
| Terminate | 3 | OFF |
| Direct-Get | 2 | OFF |
| Direct-Set | 2 | OFF |
| Back Up | 1 | ON |
| ……… | … | …… |
| ……… | … | …… |

Pi: REQUEST NUMBER TAKEN OUT OF QUEUE BUFFER FOR USER LEVEL i
Ai: CONSTANT
i: USER LEVEL

AFTER INSERTION

TO_1~TO_3: TARGET OBJECT

TO_1, TO_2: TARGET OBJECT

MESSAGE CONTROL APPARATUS

BACKGROUND OF THE INVENTION

1. Field of the Invention

The present invention relates to a message control apparatus, and in particular to a message control apparatus for transferring messages between objects which belong to different processes.

In a system using the object-oriented technique, communications between objects which belong to the different processes are performed by transferring messages such as request messages between the processes. Each of the processes is required to perform at least the change of the order for transferring the messages and the adjustment of a load for transferring the messages.

2. Description of the Related Art

FIG. 20 shows an arrangement (1) of a conventional message control apparatus 100. This message control apparatus 100 forms a process together with a message receiver 200 which receives a request message (hereinafter occasionally abbreviated as a request) 700 and target objects TO_1–TO_3 which are the destinations of the request 700.

The message control apparatus 100 is composed of a message distributor 300 connected to the message receiver 200 and queue buffers 431–433 respectively corresponding to the target objects TO_1–TO_3. Threads 500_1–500_3 (occasionally represented as 500) are respectively given to the target objects TO_1–TO_3 from the queue buffers 431–433.

In operation, ① the message receiver 200 sends the received request 700 to the message distributor 300; ② the message distributor 300 distributes the request 700 as sequentially received in the form of requests $R_1$, $R_2$, $R_3$, and $R_9$, requests $R_4$ and $R_5$, and requests $R_6$, $R_7$, and $R_8$ to the queue buffers 431–433 corresponding to the target objects TO_1–TO_3 which are the destinations of the requests; ③ the target objects TO_1–TO_3 respectively perform a polling to the queue buffers 431–433 at predetermined time intervals, and if there are buffered requests, a single thread is prepared to take out the requests one by one for the processing.

Namely, each of the target objects TO_1–TO_3 always takes out the request 700 to which the FIFO (first-in first-out) method is applied at the queue buffers 431–433 regardless of the importance and the priority of the request 700 to process the same.

Accordingly, when the requests $R_1$, $R_2$, and $R_3$ are received from a process of the first transmitting source and the request $R_9$ is from a process of the second transmitting source and when the priority of the second process is higher than that of the first process, the target object TO_1 cannot process the request $R_9$ until the requests $R_1$, $R_2$, and $R_3$ are done.

Also, even if the request $R_3$ is so important as required to be more quickly processed than the requests $R_1$ and $R_2$, the request $R_3$ is not processed until the requests $R_1$ and $R_2$ are sequentially processed, so that a standby time becomes long.

FIG. 21 shows an arrangement (2) of the conventional message control apparatus 100 which solves the above-mentioned problem. This arrangement is different from the above-mentioned arrangement (1) in that there is no queue buffers like the buffers 431–433, and the message distributor 300 gives a plurality of threads 500_1–500_3 and 500_4–500_6 to the target objects TO_1 and TO_2, respectively.

In operation, ① the message receiver 200 sends the received request 700 to the message distributor 300; ② the message distributor 300 prepares the threads 500_1–500_3 respectively for requests Get1, Set1, and Get2 which form the request 700 between the request 700 and the destination, i.e. the target object TO_1. At the target object TO_1, a Get processor 610 simultaneously processes the requests Get1 and Get2, while a Set processor 620 processes the request Set1.

Similarly, the message distributor 300 prepares the threads 500_4–500_6 respectively for requests 701–703 towards the target object TO_2, which simultaneously processes the requests 701–703.

Accordingly, in the message control apparatus 100, there is no standby time in the presence of the prior art queue buffer of FIG. 20.

However, since the thread 500 should be prepared for all of the request 700, it is disadvantageous that the number of threads simultaneously prepared increases with the overhead in the process increased so that the process speed of the whole system is delayed.

SUMMARY OF THE INVENTION

It is accordingly an object of the present invention to provide a message control apparatus for transferring messages between objects which belong to different processes, which increases the process speed of the whole system.

In order to achieve the above-mentioned object, a message control apparatus, according to claim 1, of the present invention comprises a queue buffer provided for each of target objects, a message distributor for distributing the messages to the queue buffers corresponding to the target objects, and a thread controller for taking out the messages from the queue buffers to simultaneously prepare a plurality of threads to be given to a corresponding target object, the thread controller including a thread managing table for managing a maximum thread allocation number of the messages that all of the threads inside each process can process; and a present process message number. The thread controller assumes a standby state without taking out the messages when the process message number exceeds the maximum thread allocation number.

FIG. 1 shows a principle (1) of a message control apparatus 100 of the present invention. This message control apparatus 100 comprises queue buffers 431 and 432 corresponding to target objects TO_1 and TO_2 inside a single process, a message distributor 300 to which a message 700 is given from a message receiver 200 which receives the message 700 from another process and which distributes the message 700 to a destination e.g. the queue buffer 431 corresponding to the target object TO_1, and thread controllers (not shown) which prepare a thread 500_1 through taking out the message 700 from the queue buffer 431 and send the same to the target object TO_1. The thread controller is provided corresponding to the target objects TO_1 and TO_2.

In addition, the message control apparatus 100 includes a thread managing table 460, which is composed of a maximum thread allocation number portion 461 and a process message number portion 462. In the maximum thread allocation number portion 461, a maximum thread number that the thread controllers of the message control apparatus 100 can prepare, i.e. the number of messages that can be simultaneously processed inside a single process, is preset. In the process message number portion 462, the message number that is being processed at the moment, i.e. the number of threads that are being prepared at the moment, is set.

In operation, the message distributor 300 receives the message 700 addressed to e.g. the target object TO_1 from the message receiver 200 and distributes the message 700 to the queue buffer 431. The queue buffer 431 holds the message 700. The thread controller takes out the message 700 held in the queue buffer 431 in the order of arrival to prepare the thread 500_1, which is given to the target object TO_1, as shown by ①.

At this time, the thread controller increments the process message number portion 462 by "1", and decrements the same by "1" when the message 700 are received by the target object TO_1. Similarly, the thread controller corresponding to the target object TO_2 also increments or decrements the process message number portion 462.

② In case of the value of the present process message number portion $462 \geq$ that of the maximum thread allocation number portion 461, all of the thread controllers assume a standby state without taking out the messages and preparing the threads.

As a result, it becomes possible to limit the message number processed inside the message control apparatus 100 and to improve a system process efficiency by decreasing an overhead which is caused by a CPU of the process being loaded with excessive threads.

Alternatively, in the present invention according to claim 2, a message control apparatus may comprise a queue buffer provided for each of target objects, a message distributor for distributing the messages to the queue buffers corresponding to the target object, and a thread controller for taking out the messages from the queue buffers to simultaneously prepare a plurality of threads to be given to a corresponding target object, the thread controller including a thread managing table for managing, for each of the target objects, a maximum thread allocation number that allows the messages to be given to the target objects, and a present process message number. The thread controller assumes a standby state without taking out the messages of the corresponding target object when the process message number exceeds the maximum thread allocation number.

FIG. 2 shows a principle (2) of the message control apparatus 100 of the present invention. The basic arrangement of the apparatus 100 is the same as that of the principle (1) except that thread managing tables 460_1 and 460_2 are provided for the thread controllers instead of the thread managing table 460. Also, in the thread managing tables 460_1 and 460_2, maximum thread allocation number portions 461_1 and 461_2 (occasionally represented as 461) indicate the maximum thread allocation number that each of the thread controllers can prepare, and message number portions 462_1 and 462_2 (occasionally represented as 462) indicate the message number as processed at the moment are provided.

In operation, each of the thread controllers takes out the message 700, increments the corresponding process message number by "1" every time the thread 500 is prepared, and decrements the same by "1" every time the messages are given to the target object. In case of the value of the process message number portion $462 \geq$ the value of the maximum thread allocation number portion 461, the thread controllers assume the standby state.

As a result, in the same way as the invention according to claim 1, it becomes possible to improve the process efficiency by decreasing the overhead which is caused by the CPU of the process being loaded with excessive threads.

Also, in the present invention according to claim 3, the message control apparatus may further comprise a thread allocation controller including a thread allocation managing table for holding the maximum thread allocation number corresponding to a CPU serviceability ratio in the processes, and the thread allocation controller may monitor the CPU serviceability ratio at predetermined time intervals and designate the maximum thread allocation number corresponding to the CPU serviceability ratio in the thread allocation managing table as the maximum thread allocation number for the thread managing table.

FIG. 3 shows a principle (3) of the message control apparatus 100 of the present invention. The basic arrangement of the apparatus 100 is the same as that of FIGS. 1 or 2 except that a thread allocation controller 470 is added.

The thread allocation controller 470 has a thread allocation managing table 471, in which the maximum thread allocation number portion 461 corresponding to a CPU serviceability ratio 480 in the process is preset.

In operation, the thread allocation controller 470 monitors the CPU serviceability ratio 480 at predetermined time intervals and designates the maximum thread allocation number corresponding to the CPU serviceability ratio 480 in the thread allocation managing table 471 as the value of the maximum thread allocation number portion 461 in the above-mentioned thread managing table 460. Each of the thread controllers assumes the standby state in case of the value of the process message number portion $462 \geq$ the value of the maximum thread allocation number portion 461.

Namely, by obtaining the maximum thread allocation number from the CPU serviceability ratio referring to the thread allocation managing table 471 and allotting this maximum thread allocation number to the maximum thread allocation number portion 461 in the thread managing table 460, the thread allocation controller 470 can adjust the load of the message control apparatus 100 according to the load state of the system. As a result, it becomes possible to improve the process efficiency by decreasing the overhead which is caused by the CPU of the process being loaded with excessive threads.

Also, in the present invention according to claim 4, the message control apparatus may further comprise a message managing portion, for managing the queue buffer and the thread controller, which checks the present process message number at predetermined time intervals and for allotting a part of the maximum thread allocation number of the thread managing table having a smaller present process message number to the maximum thread allocation number for the thread managing table of another target object having a larger present process message number.

Namely, the message managing portion obtains the process message number/maximum thread allocation number, that is the ratio of both in each of the thread managing tables, and regards this value as the serviceability ratio for each of the thread controllers. A part of the maximum thread allocation number of the thread controller with a low serviceability ratio is allotted to the maximum thread allocation number of the thread controller with a high serviceability ratio.

As a result, the higher the serviceability ratio is, the larger the maximum thread allocation number of the thread controller becomes, so that it becomes possible to improve the process efficiency of the message control apparatus 100.

Also, in the present invention according to claim 5, priority levels may be respectively set for transmitting source processes, the queue buffer may be provided for each priority level, the thread controller may include a first thread portion allotted only to the messages with a high priority level and a second thread portion allotted to the other messages, and when the second thread portion is occupied only the messages with the high priority level are allotted to the first thread portion.

FIG. 4 shows a principle (4) of the message control apparatus 100 of the present invention. A thread portion 500 is shown therein which consists of 11 threads that the thread controller corresponding to one of the above-mentioned targets, e.g. the target object TO_1, can prepare. The 11 threads are preset in the maximum thread allocation number portion 461. In this example, four secured threads for the messages with a high priority level are provided as a first thread portion 510, and the remaining seven normal threads are provided as a second thread 520, in the thread portion 500.

In operation, while the process message number does not amount to the thread number of the thread portion 520, the thread controller prepares the normal thread to be given to the target object TO regardless of the priority level of the message 700. When the process message number has amounted to the thread number of the thread portion 520, the thread controller takes out only the messages with a high priority level and has the thread portion 510 prepare the thread to be given to the target object.

As a result, the message 700 from a transmitting source process with a high priority level can preferentially be given to the target object.

Also, in the present invention according to claim 6, priority levels may respectively be set for transmitting source processes, the queue buffer may be provided for each priority level, and the thread controller may preferentially take out the messages from the queue buffer with the high priority level.

The priority levels are firstly set for every transmitting source process. Namely, the corresponding priority levels are preset to the messages from each process. In addition, the queue buffers are provided corresponding to the priority levels.

The thread controller preferentially takes out the messages from the queue buffer with a high priority level, and prepares the thread to be given to the target object.

As a result, it becomes possible to preferentially process the messages from the transmitting source process with a high priority level.

Also, in the present invention according to claim 7, the queue buffer may further be provided for each transmitting source process.

FIG. 5 shows a principle (5) of the message control apparatus 100 of the present invention, in which only the queue buffer 431 and the target object TO_1 shown in FIG. 1 are shown. In the queue buffer 431, queue buffers 431_1–431_n respectively corresponding to e.g. transmitting source processes 1–n are provided.

In operation, the message distributor 300 (see FIG. 1) distributes the received messages to the queue buffers 431_1–431_n respectively corresponding to the transmitting source processes 1–n. The thread controllers (not shown) sequentially take out the message 700 from the queue buffers 431_1–431_n, and prepare the thread 500 to be given to the target object TO.

As a result, it becomes possible to equally send the message 700 from each process to the target object TO.

Also, in the present invention according to claim 8, priority levels may respectively be set for operations included in the messages, and a message sort controller may further be provided for rearranging the messages in the order of the priority level.

FIGS. 6A–6C show a principle (6) of the message control apparatus 100 of the present invention. FIG. 6A shows information included in the message 700. The information is composed of a message name R, an arrival order x at the queue buffer 431, an operation name O, and a priority level p.

FIG. 6B shows the messages ($R_1$–$R_6$) 700 of the arrival order before a rearrangement held in the queue buffer 431. The operation name O of messages $R_1$–$R_6$ includes "G", "A", "S", "P", "B", and "S", respectively having priority levels of "3", "1", "3", "2", "2", and "3".

In operation, the message sort controller (not shown) sorts the order of the messages $R_1$, $R_2$, $R_3$, $R_4$, $R_5$, and $R_6$ shown in FIG. 6B according to an operation priority level P, so that the order of the operation + priority levels becomes $A_1$, $P_2$, $B_2$, $G_3$, $S_3$, and $S_3$ as shown in FIG. 6C. Namely, the message order becomes $R_2$, $R_4$, $R_5$, $R_1$, $R_3$, and $R_6$.

As a result, the messages including the operation with a high priority level are preferentially given to the target object TO.

Also, in the present invention according to claim 9, time stamps may be allotted to the messages and the thread controller may preferentially take out the messages whose time stamps indicate that a fixed time has elapsed.

FIGS. 7A–7C show a principle (7) of the message control apparatus 100 of the present invention. FIG. 7A shows information included in the message 700. This information is composed of the message name R, the arrival order x, and a time stamp Tc. FIG. 7B shows messages $R_{20}$, $R_{12}$, $R_{13}$, $R_8$, $R_{15}$, and $R_2$ which the queue buffer 431 holds. The values of the time stamp Tc for these messages $R_{20}$, $R_{12}$, $R_{13}$, $R_8$, $R_{15}$, and $R_2$ "4", "10", "9", "13", "7", and "21" are counted up by "1" after the message 700 is given from the queue buffer 431 to the target object TO through the thread 500.

In operation, the message sort controller (not shown) detects that the time stamp Tc i.e. 21 of the message $R_2$ exceeds a preset value "20", interrupts the message $R_2$ into the head of the queue buffer 431 as shown in FIG. 7C, and sends the message $R_2$ to the target object TO with a top priority. As a result, the message will be taken out at least within a fixed time.

Also, in the present invention according to claim 10, an exclusive control flag may be allotted to each process, the messages may include exclusive control information, the thread controller may set the exclusive control flag when the control information is set, and all of the thread controllers take out only the messages to which the exclusive control information is set.

Namely, the exclusive control flag is provided inside the process and the messages have exclusive control information. When taking out the messages in which the exclusive control information is set, the thread controller prepares the thread, gives the messages to the target objects, and sets the exclusive control flag.

While the exclusive flag is set, all of the thread controllers take out only the messages in which the exclusive control flag is set and do not take out the other messages. When the exclusive control information is set and all of the messages having threads prepared are processed at the moment by the corresponding target objects, the exclusive control flag set is reset.

As a result, it becomes possible to preferentially take out specific messages in which the exclusive control flag is set and to give them to the target object.

Also, in the present invention according to claim 11, request messages may be used as the messages.

Furthermore, in the present invention according to claim 12, the transmitting source process may comprise a transmitting source object.

BRIEF DESCRIPTION OF THE DRAWINGS

FIGS. 14A and 14B are diagrams showing a definition table example of user levels and priority levels used in a message control apparatus according to the present invention;

Throughout the figures, like reference numerals indicate like or corresponding components.

DESCRIPTION OF THE EMBODIMENTS

Figure 8:
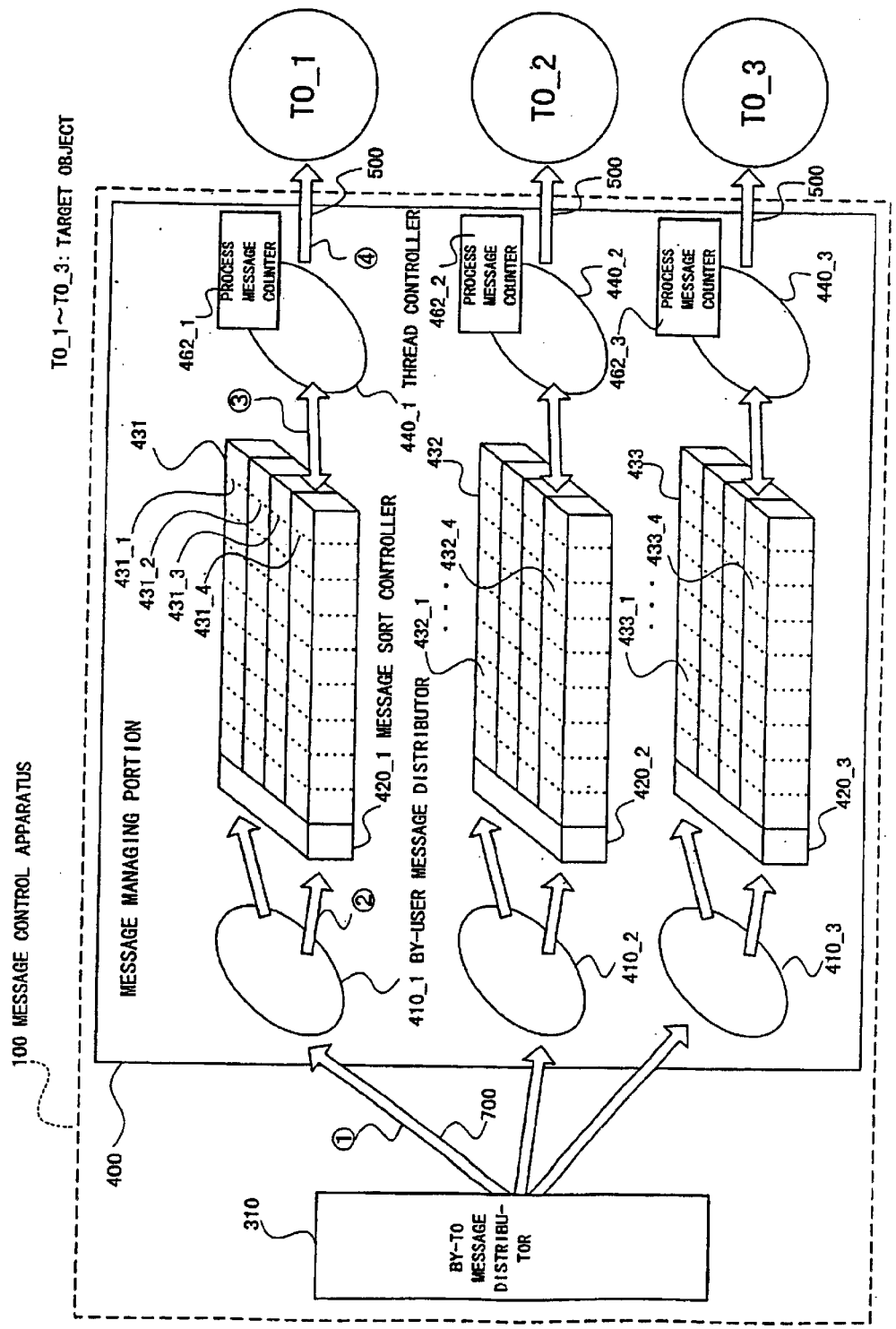
FIG. 8 is a block diagram showing an embodiment (1) of a message control apparatus according to the present invention.

FIG. 8 shows an embodiment (1) of the message control apparatus 100 according to the present invention. In this embodiment, the message control apparatus 100 is composed of a message distributor by or per the target object TO (hereinafter abbreviated as by-TO message distributor) 310 and a message managing portion 400 which is connected to the by-TO message distributor 310 and provides the target objects TO_1–TO_3 with the request message 700. It is to be noted that while the request messages are taken as one example in the following description, other various kinds of messages may be applied in addition to the request messages.

The message managing portion 400 is composed of message distributors by users 410_1–410_3 (occasionally represented as 410) corresponding to the target objects TO_1–TO_3, message sort controllers 420_1–420_3 (occasionally represented as 420) connected to the distributors 410_1–410_3, the queue buffers 431–433 connected to the controllers 420_1–420_3, and thread controllers 440_1–440_3 (occasionally represented as 440) connected to the buffers 431–433.

Figure 1:
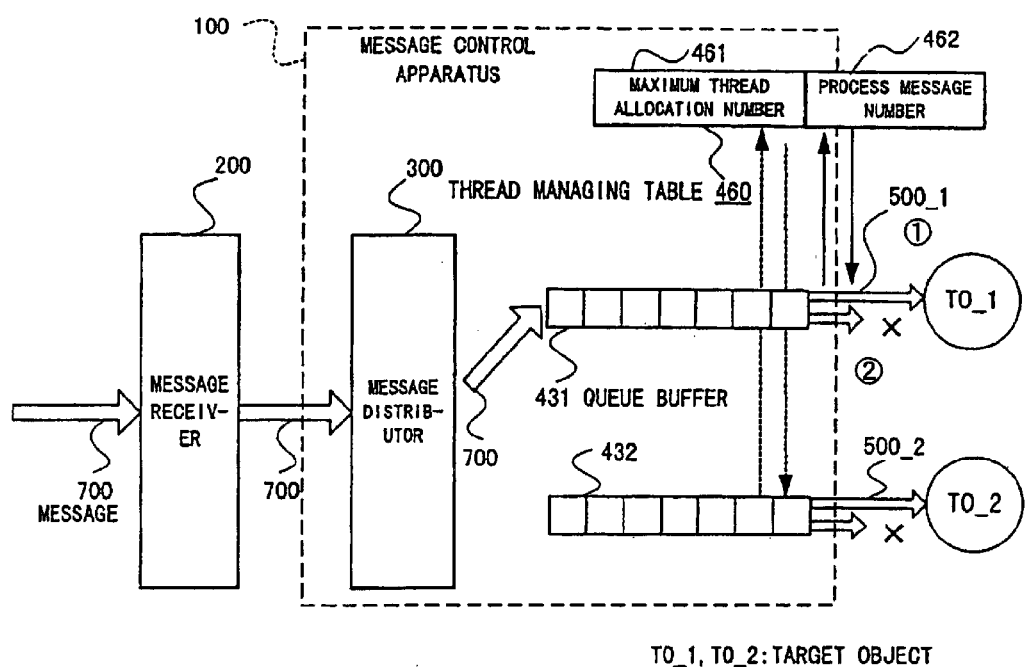
FIG. 1 is a block diagram showing a principle (1) of a message control apparatus according to the present invention.
Figure 2:
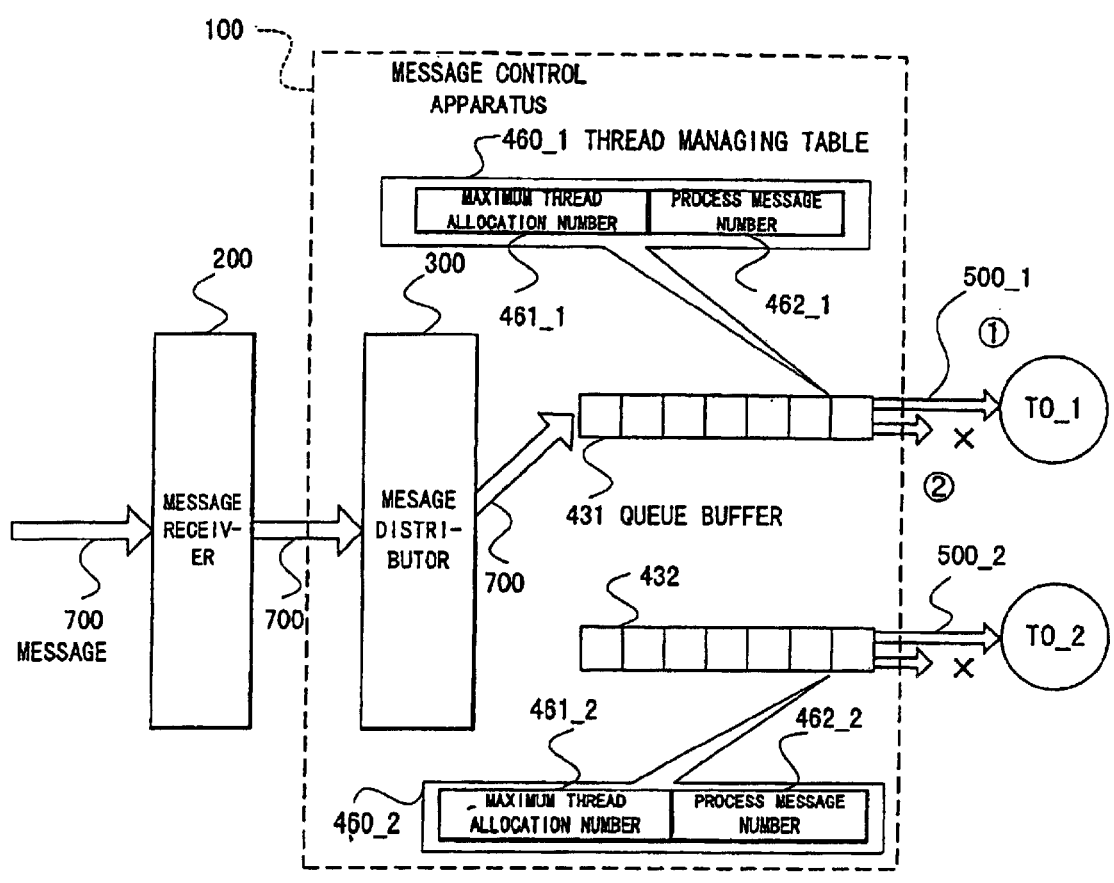
FIG. 2 is a block diagram showing a principle (2) of a message control apparatus according to the present invention.

The by-user message distributors 410_1–410_3 are commonly connected to the by-TO message distributor 310, and the thread controllers 440_1–440_3 are respectively connected to the target objects TO_1–TO_3. In addition, the queue buffers 431–433 are respectively composed of by-user queue buffers 431_1–431_4, 432_1–432_4, and 433_1–433_4. In the thread controllers 440_1–440_3, the thread managing table 460 (see FIG. 2) composed of the maximum thread allocation number portion 461 and the process message number portion 462 is included, while FIG. 8 shows only the process message number portion 462 as a process message number counter 462.

In operation, the by-TO message distributor 310 distributes the received request 700 to the address of the by-user message distributor 410 corresponding to the target objects TO_1–TO_3. The by-user message distributor 410 distributes the request 700, through the message sort controller 420, to each of the users such as processes and objects of the transmitting source to be given to the by-user queue buffers 431_1–431_4, for instance, with respect to the queue buffer 431.

The thread controller 440_1, for instance, sequentially takes out the request 700 buffered at the queue buffers 431_1–431_4, and prepares the thread 500 to be sent to the target object TO_1. Every time the request 700 is taken out, the thread controller 440_1 increments the process message number counter 462_1 by "1". In case of the value of the process message number counter 462_1≧that of the maximum thread allocation number, the thread controller 440_1 assumes a standby state to stop taking out the request 700.

The target object TO_1 simultaneously processes the received a plurality of requests 700 as received. When the process of a single request 700 is finished, the target object TO_1 notifies the fact to the thread controller 440_1. The thread controller 440_1 decrements the process message number counter 462 by "1", and begins again to take out the request 700 in case of the value of the process message number counter 462_1<the value of the maximum thread allocation number portion 461.

As a result, it becomes possible to transfer the messages without putting the CPU into its overhead state due to preparing excessive threads and without decreasing the process speed of the whole system and to equally send the message 700 from each process (user) to the target object TO.

It is to be noted that while in this embodiment each of the thread controllers 440 includes the thread managing table 460 composed of the maximum thread allocation number and the process message number and determines whether or not taking out the request 700 should be stopped by comparing the maximum thread allocation number 461 with the process message number 462, this embodiment may be modified such that a single thread managing table 460 is provided for the whole processes, the thread controller 440 increments the process message number counter 462 by "1" every time a single request 700 is taken out, and all of the thread controllers 440 stop taking out the request 700 to have the standby state in case of the value of the process message number counter 462 ≧ that of the maximum thread allocation number portion 461 whereby the same efficiency can be obtained.

Figure 9:
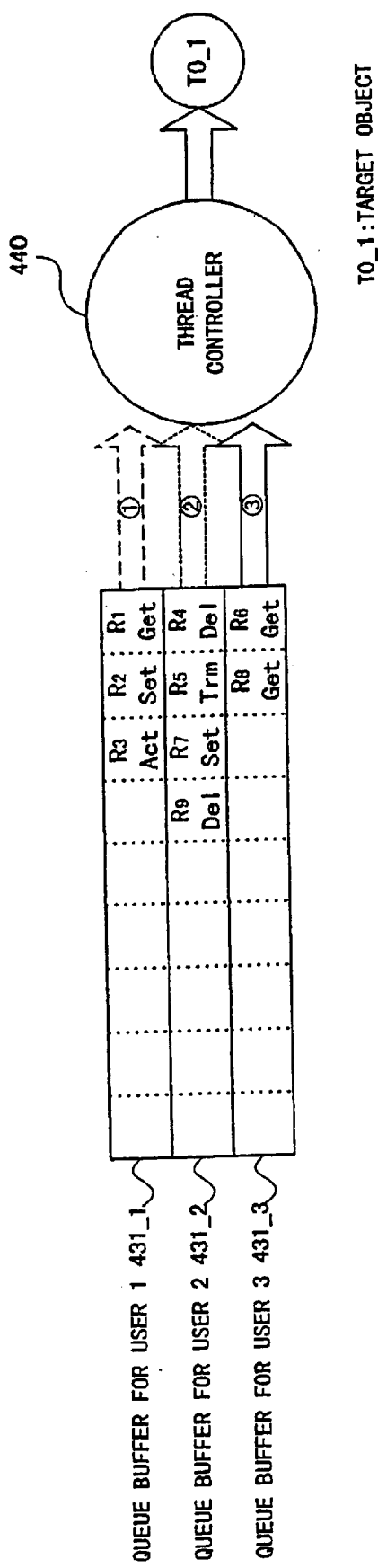
FIG. 9 is a diagram showing a request process procedure by users in a message control apparatus according to the present invention.

FIG. 9 shows in more detail the operations of the queue buffers 431_1–431_3, the thread controller 440, and the target object TO_1 in the embodiment (1) shown in FIG. 8. The requests $R_1$ (Get), $R_2$ (Set), and $R_3$ (Act), the requests $R_4$ (Del), $R_5$ (Trm), $R_7$ (Set), and $R_9$ (Del), the requests $R_6$ (Get) and $R_8$ (Get) all addressed to the target object TO_1 are distributed for the users 1–3 as the transmitting sources at the by-user message distributor 410_1 (see FIG. 8), and buffered at the queue buffers "431_1"–"431_3" respectively for the user 1–3. It is to be noted that the suffixed numbers of the requests $R_1$–$R_9$ indicate the input order of the requests (and so forth).

Figure 10:
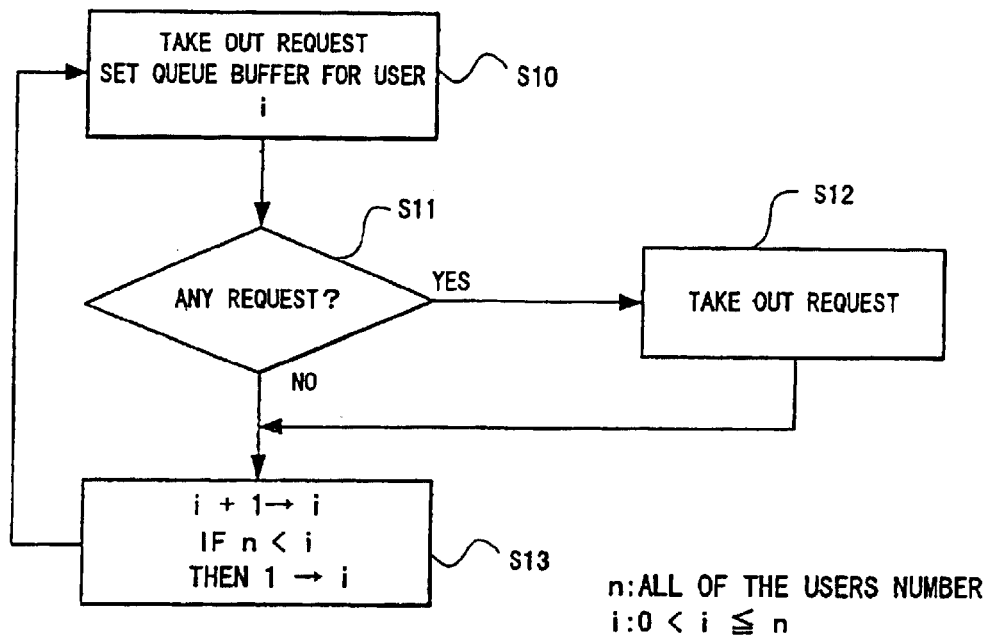
FIG. 10 is a flow chart showing an example of an operation procedure (1) of a thread controller in a message control apparatus according to the present invention.
Figure 6A:
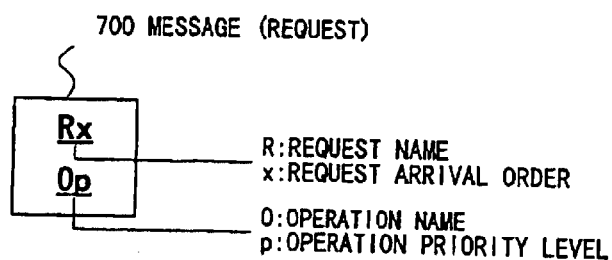
FIGS. 6A–6C are block diagrams showing a principle (6) of a message control apparatus according to the present invention.
Figure 6B:
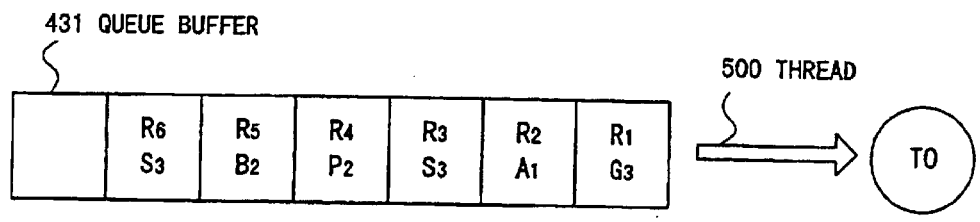
Figure 6C:
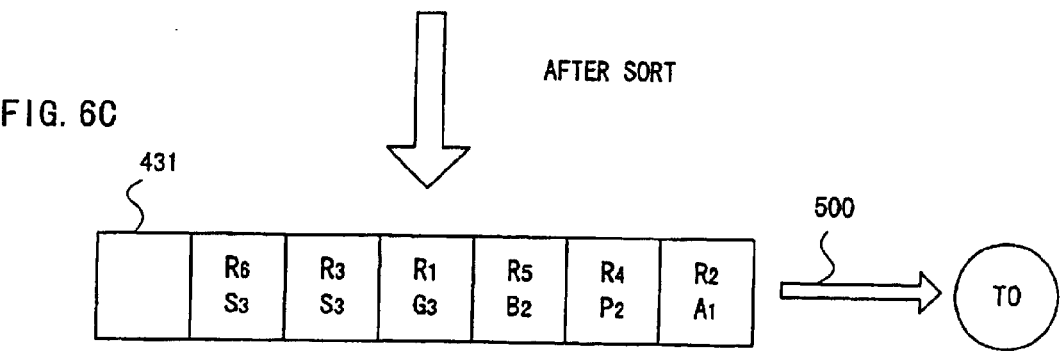
Figure 7A:
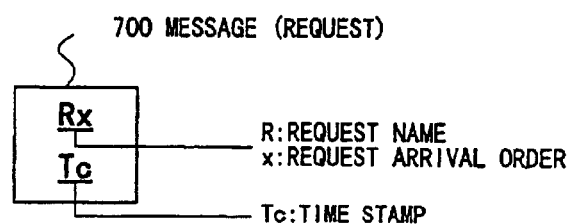
FIGS. 7A–7C are block diagrams showing a principle (7) of a message control apparatus according to the present invention.
Figure 7B:
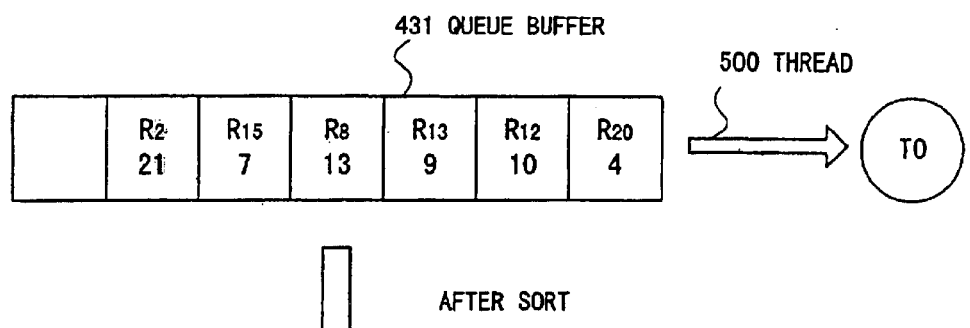
Figure 7C:
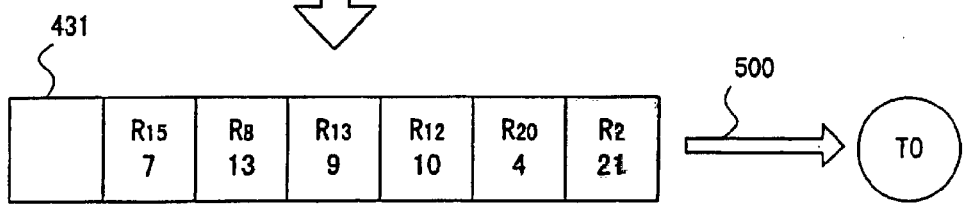

FIG. 10 shows an example of an operation procedure (1) of the thread controller 440 shown in FIGS. 8 and 9. The operation of the thread controller 440 will be described as follows referring to FIG. 9:

The thread controller 440 firstly sets the user number of the queue buffer from which the request is taken out to i=1 (at step S10), and determines whether or not there is a request (at step S11). In the absence of requests, the thread controller 440 proceeds to step S13. In the presence of a request $R_1$, ① the thread controller 440 takes out the request $R_1$ from the queue buffer 431_1 (at step S12), prepares the thread to be given to the target object TO_1, and proceeds to step S13.

At step S13, the thread controller 440 increments i by "1", and determines whether or not i (=2)>n (n: the user number "3"). In case of i≦3, the thread controller 440 returns to step S10, and sets the user number of the queue buffer to i=2. In the presence of a request $R_4$ (at step S11), ② the thread controller 440 takes out the request $R_4$ from the queue buffer 430_2, and prepares the threads to be given to the target object TO_1 (at step S12).

In the same way, via steps S13, S10, and S11, ③ the thread controller 440 takes out the request $R_6$ from the queue buffer 431_3, prepares the threads to be given to the target object TO_1 (at step S12), and proceeds to step S13. When i is incremented by "1" at step S13, i becomes "4" so that i is larger than 3. Therefore, the thread controller 440 restores i to 1, and returns to step S10.

After this, repeating the same operation, the thread controller 440 sequentially takes out the requests $R_2$, $R_5$, $R_8$, $R_3$, $R_7$, and $R_9$ from the queue buffers 431_1–431_3 to be given to the target object TO_1.

By this procedure, the requests can equally be processed with respect to the users of the transmitting source. Accordingly, a standby time for the requests for each user is shortened compared with the case where the queue buffers are not divided into each user.

Figure 11:
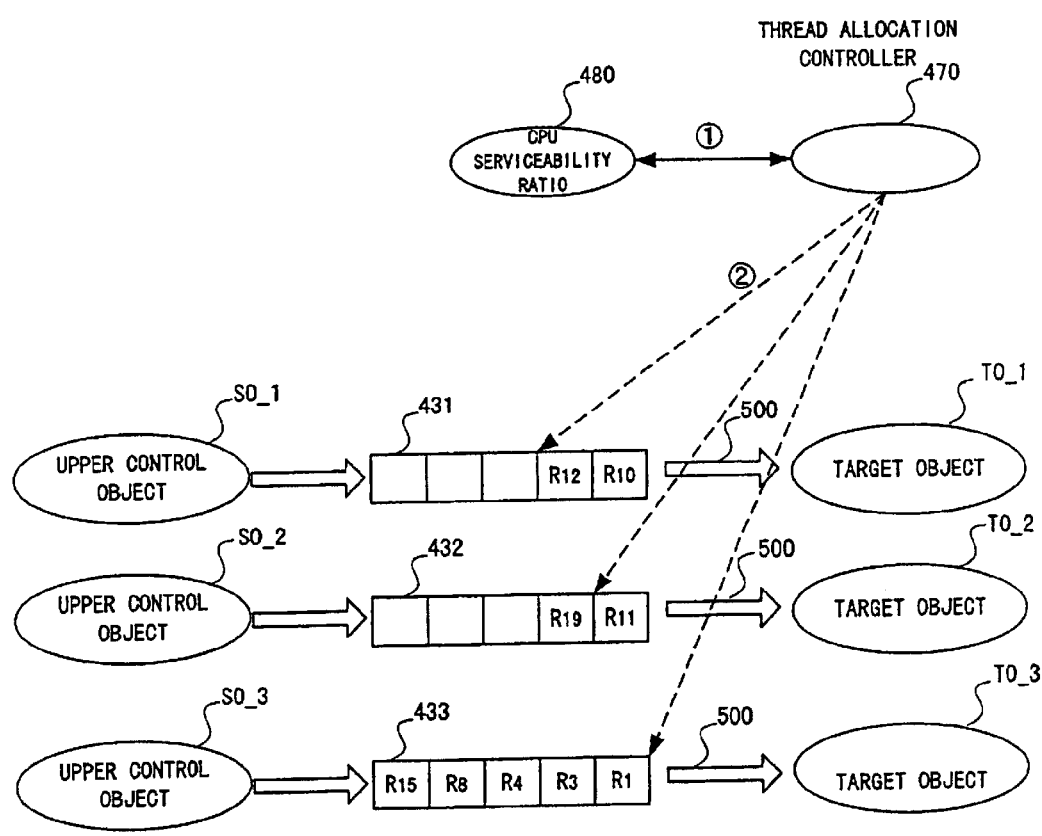
FIG. 11 is a block diagram showing an embodiment (2) of a message control apparatus according to the present invention.

FIG. 11 shows an embodiment (2) of the message control apparatus 100 of the present invention. This embodiment shows an example of information management in the network monitoring control system in which a network managing system manages a plurality of network control systems, and especially shows a case where the message control apparatus in the network managing system receives a large number of requests for a short time from the network control systems through upper control objects SO_1–SO_3 which compose the transmitting source processes.

Figure 3:
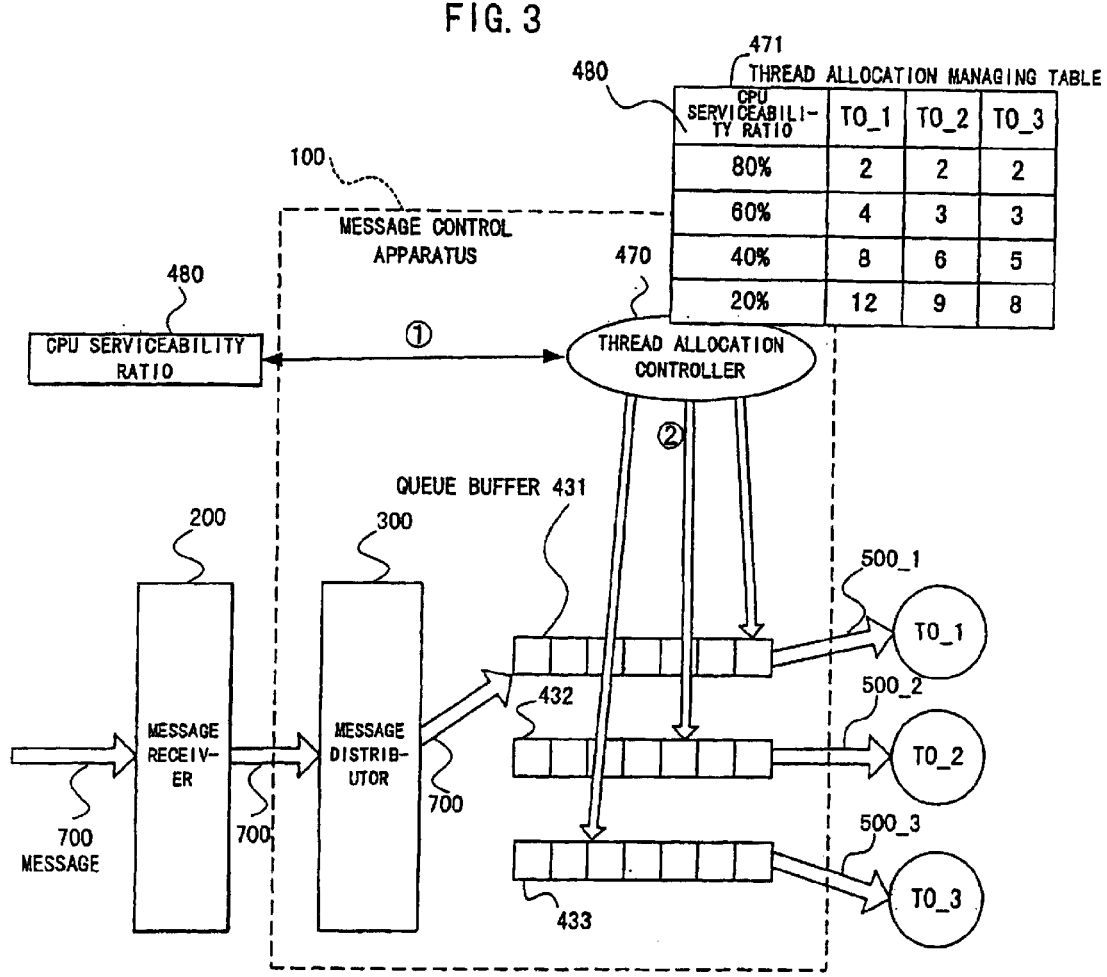
FIG. 3 is a block diagram showing a principle (3) of a message control apparatus according to the present invention.
Figure 4:
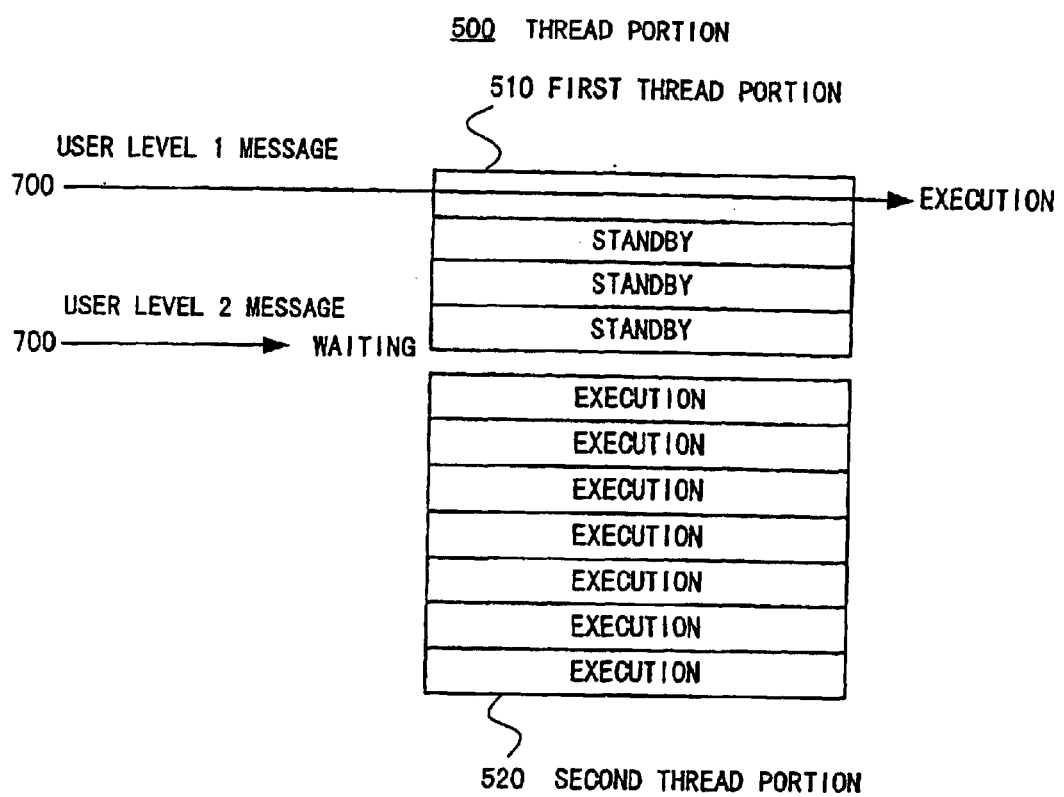
FIG. 4 is a block diagram showing a principle (4) of a message control apparatus according to the present invention.
Figure 5:
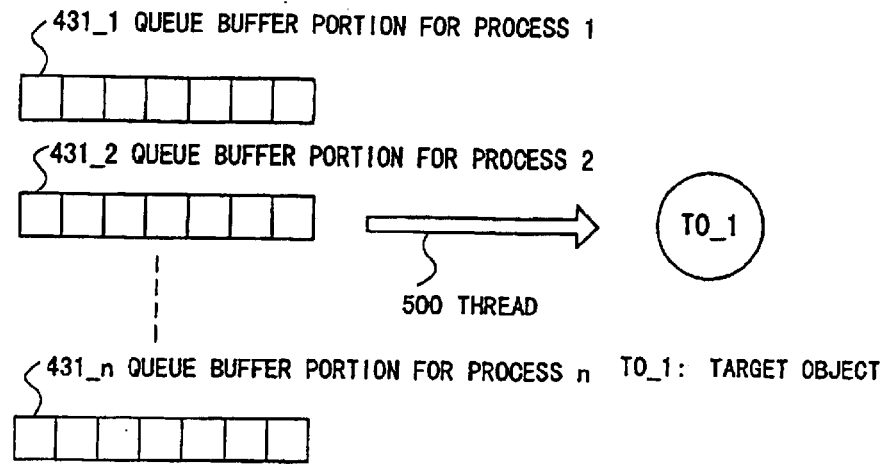
FIG. 5 is a block diagram showing a principle (5) of a message control apparatus according to the present invention.

The message control apparatus 100 is provided with the thread allocation controller 470 which further inputs the CPU serviceability ratio 480 into the components of the embodiment (1) shown in FIG. 8 and has the thread allocation managing table 471 (see FIG. 3).

In operation, requests $R_{10}$ and $R_{12}$, requests $R_{11}$ and $R_{19}$, and requests $R_1$, $R_3$, $R_4$, $R_8$, and $R_{15}$ from the upper control objects SO_1–SO_3 are distributed at the message distributor 300 (see FIG. 3), and buffered at the queue buffers 431–433. Then, ① the thread allocation controller 470 inputs the present CPU serviceability ratio e.g. 80% and obtains the maximum thread allocation numbers "2", "2", and "2" (see FIG. 3) for the target objects TO_1–TO_3 which are the function objects referring to the thread allocation managing table 471, and ② the thread allocation controller 470 makes the allocation numbers "2", "2", and "2" the maximum thread allocation number of the thread managing table 460 (see FIG. 2) in the thread controller 440 (see FIG. 8).

The thread controllers 440_1–440_3 prepare the threads 500 whose maximum thread allocation numbers are respectively "2", "2", and "2", and give the requests $R_{10}$ and $R_{12}$, the requests $R_{11}$ and $R_{19}$, the requests $R_1$ and $R_3$ to the target objects TO_1, TO_2, and TO_3, respectively. For example, the thread controller 440_3 does not take out the requests $R_4$, $R_8$, and $R_{15}$ because threads more than "2" which is the maximum thread allocation number are not prepared despite that the requests $R_4$, $R_8$, and $R_{15}$ are buffered at the queue buffer 433.

After a predetermined time, ① the thread allocation controller 470 obtains the maximum thread allocation numbers "12", "9", and "8" (see FIG. 3) for the target objects TO_1–TO_3 from the thread allocation managing table 471 when the serviceability ratio, e.g. "20%" is inputted, and ② the thread allocation controller 470 makes them the maximum thread allocation numbers of the thread controllers 440_1–440_3 (see FIG. 8).

The thread controller 440_3 whose maximum thread allocation number assumes "8" can further take out the requests $R_4$, $R_8$, and $R_{15}$, and prepare the threads 500 to be given to the target object TO_3.

Namely, by preparing the thread of the number corresponding to the CPU serviceability ratio, it becomes possible to increase the speeds of the whole process and the transferring requests without an overhead of the CPU caused by the load of the excessive threads process.

Figure 12:
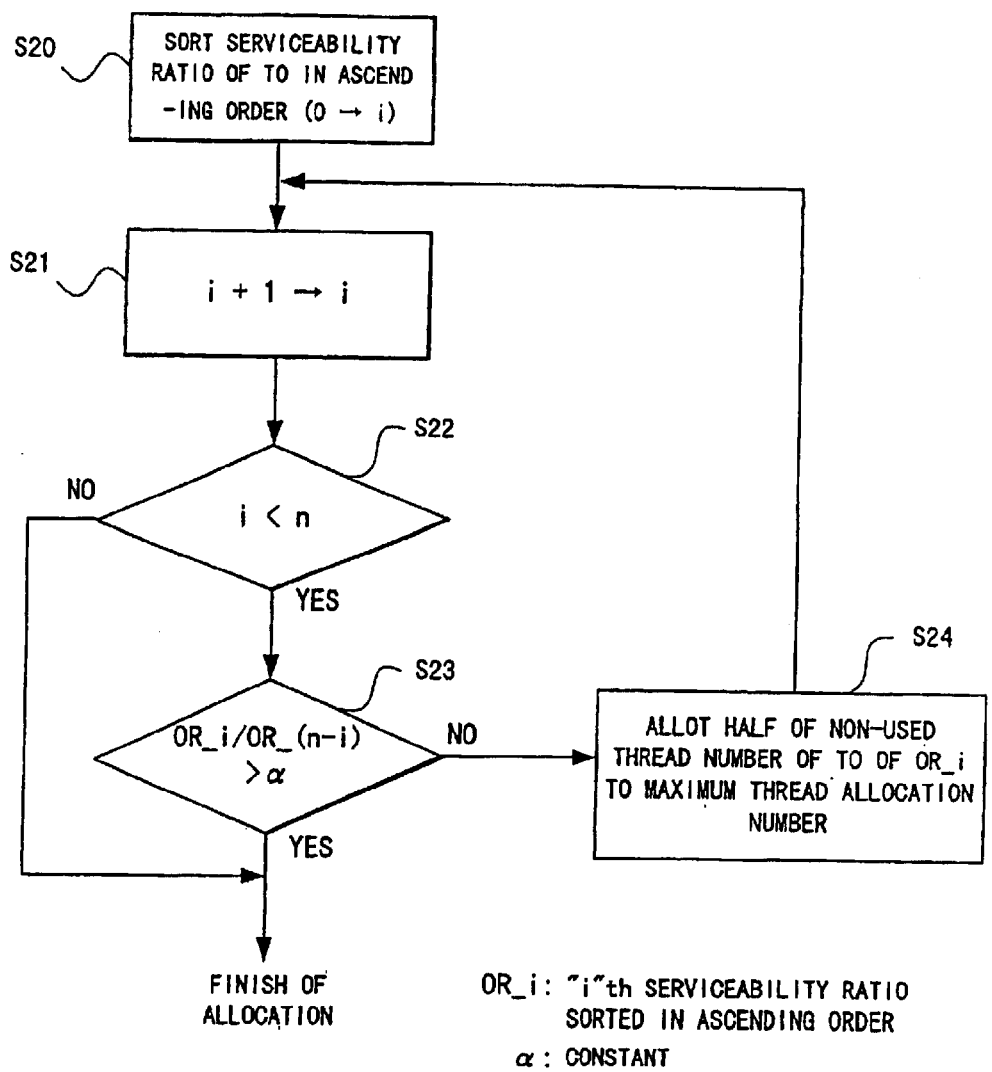
FIG. 12 is a flow chart showing an example of an operation procedure of a message managing portion in a message control apparatus according to the present invention.

FIG. 12 shows an example of an operation procedure of the message managing portion 400 in the message control apparatus of the present invention. The operation of the message managing portion 400 will be described referring to FIG. 8 where the number of users is supposed to be n, such as target objects TO__1–TO__n or thread controllers 440__1–440__n.

After setting i to the initial value "0", the message managing portion 400 reads out the maximum thread allocation number and the process message number (see the value of the process message number counter 462 in FIG. 12) of the thread managing tables 460__1–460__n (see FIG. 2) corresponding to each target object TO, and sorts the serviceability ratio OR of each of the target objects TO__1–TO__n i.e. (the process message number)/(maximum thread allocation number) in the ascending order (small→large) with an operation (at step S20). The serviceability ratio OR is assumed as OR__1–OR__n in the sorted ascending order.

After incrementing i by "1" at step S21, the message managing portion 400 proceeds to step S22, and determines whether or not i<n (n: the target object number+1), so that the operation is finished in case of i≧n. Since i (=1)<n at the first time, the message managing portion 400 proceeds to step S23, operates (the smallest serviceability ratio OR__1)/(the largest serviceability ratio OR__n−1), and proceeds to step S24 when the operation result is less than a predetermined value "α".

When the target objects corresponding to the serviceability ratio OR__1 and OR__n−1 are respectively assumed to be the target objects TO__1 and TO__3 at step S24, a half of non-used thread numbers of the target object TO__1 are allotted to the maximum thread allocation number of the target object TO__3, and returns to step S21.

In the same way, if OR__i/OR__$_{(n-i)}$>α, processes are executed such that a half of the non-used thread number of the target objects with a smaller serviceability ratio are allotted to the maximum thread allocation number of the target objects with a large serviceability ratio.

As a result, the maximum thread allocation number allotted to the target objects i.e. the thread preparing portion is dynamically allotted to the target objects with a higher serviceability ratio, so that it becomes possible to efficiently use a limited number of threads inside the message control apparatus.

Figure 13:
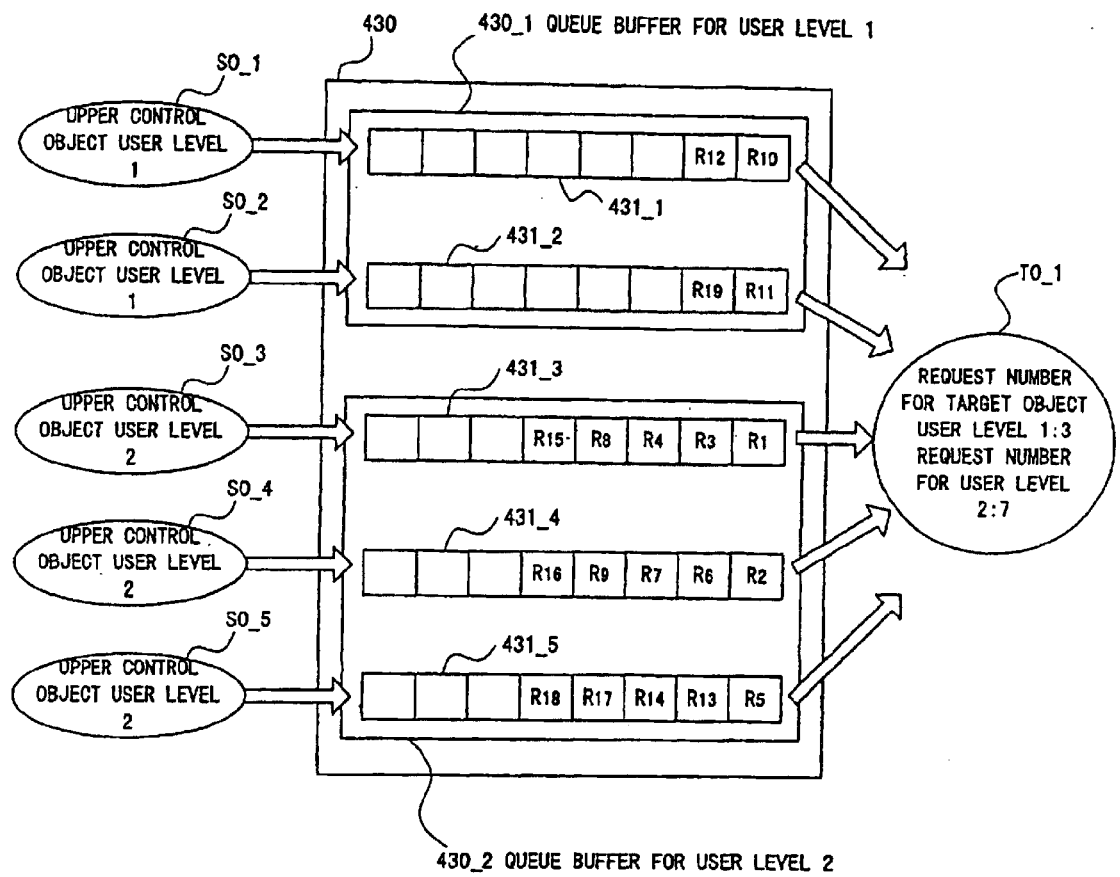
FIG. 13 is a block diagram showing an embodiment (3) of a message control apparatus according to the present invention.

FIG. 13 shows an embodiment (3) of the message control apparatus 100 of the present invention. This embodiment shows the message control apparatus 100 for receiving the requests from a plurality of network control systems like the embodiment (2) shown in FIG. 11.

The message control apparatus 100 has the queue buffer 430 which buffers the requests from upper control objects SO__1–SO__5 included in each of the network control systems to be given to the target object TO__1 which is a function object. A user level 1 is set especially to the objects SO__1 and SO__2 among the upper control objects SO__1~SO__5, and a user level 2 is set to the other objects SO__3~SO__5.

The queue buffer 430 is composed of the queue buffers 431__1–431__5 which buffer the requests from the objects SO__1–SO__5. The queue buffers 431__1 and 431__2 form the queue buffer 430__1 for the user level 1, and the queue buffers 431__3–431__5 form the queue buffer 430__2 for the user level 2, corresponding to the user levels of the objects SO__1–SO__5.

Also, as the request number which can be processed, "3" is set for the user level 1, and "7" is set for the user level 2, at the target object TO__1. The queue buffers 431__1–431__5 respectively buffer the requests $R_{10}$ and $R_{12}$, the requests $R_{11}$ and $R_{19}$, the requests $R_1$, $R_3$, $R_4$, $R_8$, and $R_{15}$, the requests $R_2$, $R_6$, $R_7$, $R_9$, and $R_{16}$, the requests $R_5$, $R_{13}$, $R_{14}$, $R_{17}$, and $R_{18}$.

FIGS. 14A and 14B show an example of a definition file which the message managing portion 400 reads at a starting time. The file in FIG. 14A shows the users and the user levels where the user levels of "1", "2", "2", "2", "2", and "2" are set to the users "Administrator", "amelio", "atari", "okonomy", "sussy", and "sundog", respectively.

The file in FIG. 14B shows request names, their priority levels, and exclusive control information. For instance, the priority levels and the exclusive control information for request names "Create" and "Back__Up" are "2", "1" and "OFF", "ON", respectively.

Figure 15:
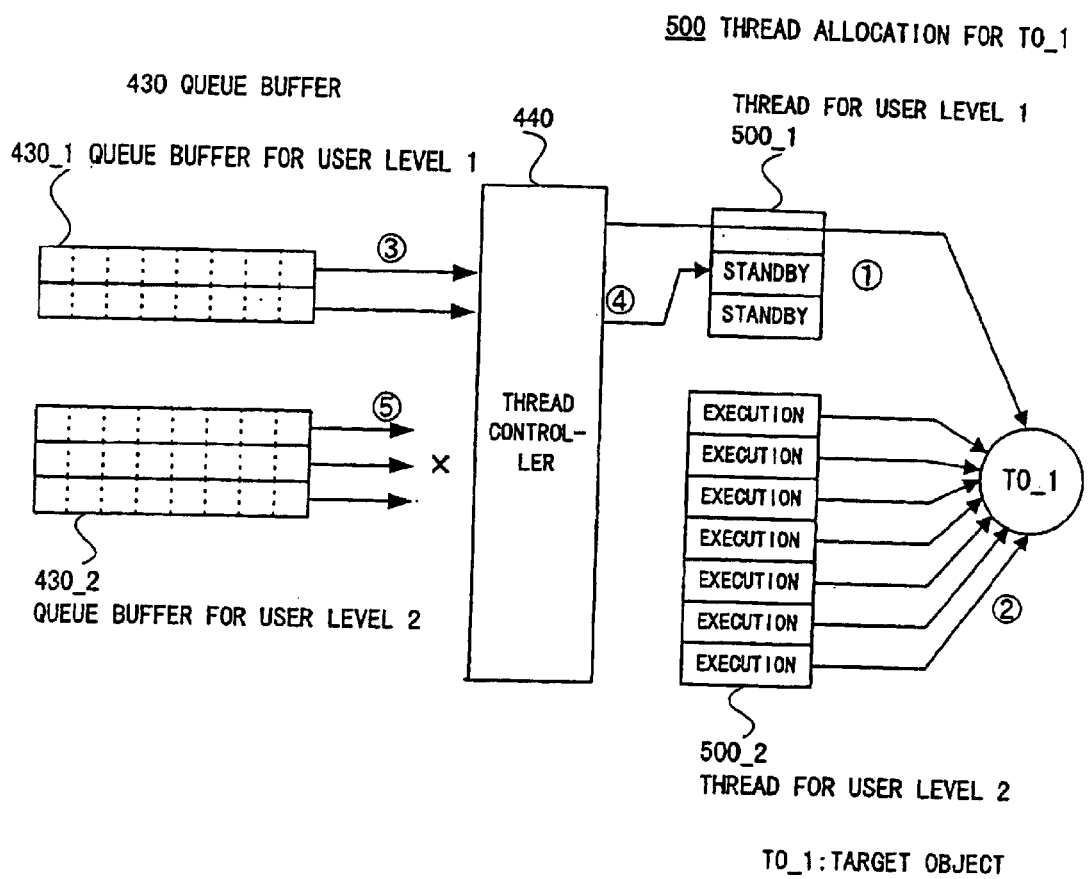
FIG. 15 is a block diagram showing an operation example (1) of a thread controller in a message control apparatus according to the present invention.

FIG. 15 shows an operation example (1) of the thread controller 440. In this operation example, the message controller 400 (see FIG. 8) reads the data of the file shown in FIGS. 14A and 14B, to which the thread controller 440 refers. Also, as the request number (simultaneous request number) which the target object TO__1 can simultaneously process, the thread controller 440 is assumed to have recognized, as the simultaneous request number $D_1$=3 and $D_2$=7 which will be described later, that the request number of "3" is set for the user level 1 and the request number of "7" is set for the user level 2 as mentioned above.

Figure 16:
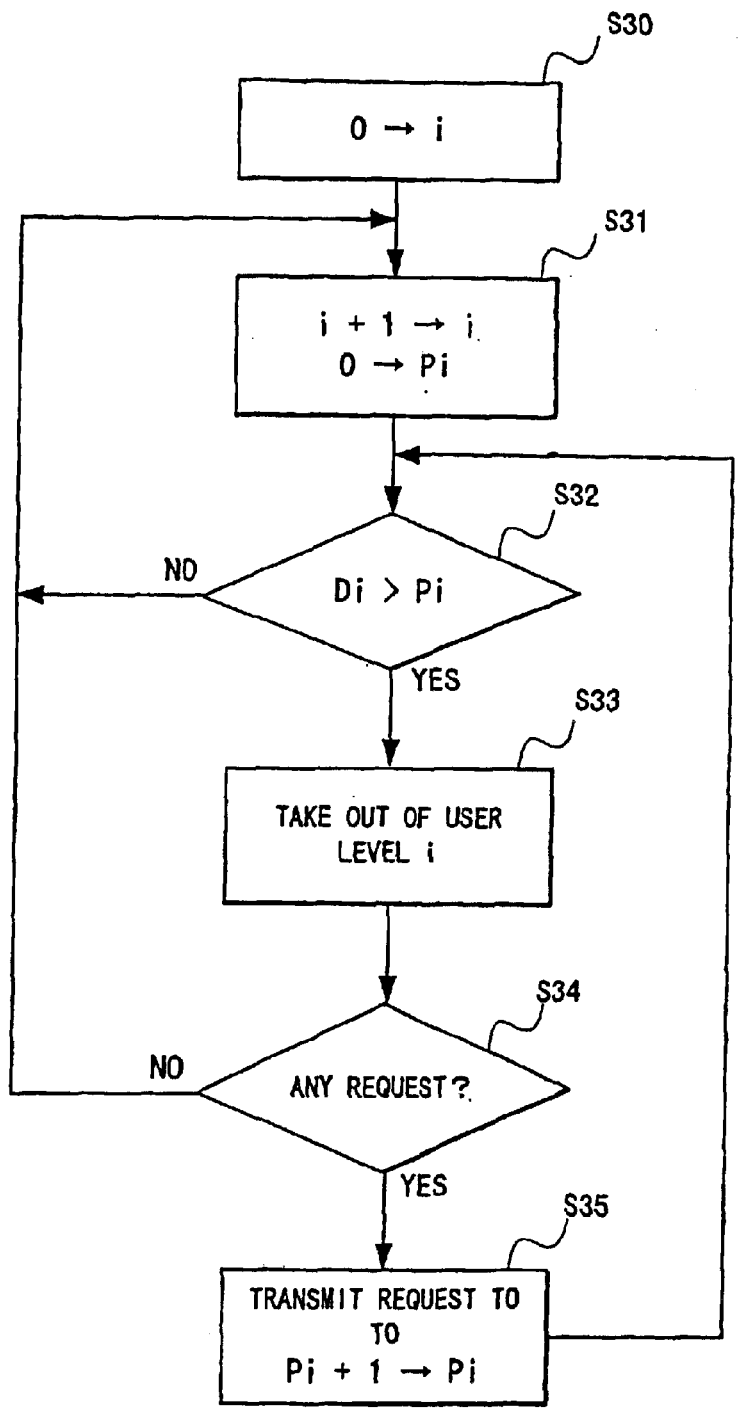
FIG. 16 is a flow chart showing an operation procedure (2) of a thread controller in a message control apparatus according to the present invention.

FIG. 16 shows an example of an operation procedure (2) of the thread controller 440 shown in FIG. 15. This procedure example being conceptually described, firstly the thread controller 440 sequentially takes out the requests from the queue buffer with a high priority level, prepares the threads to be given to the target object TO__1, and stops taking out the requests when the prepared thread number has reached the maximum number "3" of the requests with a high user level which the target object TO__1 can simultaneously process. Then the thread controller 440 moves to the taking-out operation of the requests from the queue buffer 430__1 with the second highest user level.

This will be described in more detail referring to FIG. 15. The thread controller 440 initializes i to "0" at step S30, proceeds to step S31, increments i by "1" at step S31, and initializes a request number $Pi=P_1$ to "0". It is to be noted that the request number Pi is a request number taken out of the queue buffer for the user level i.

At step S32, the thread controller 440 compares the simultaneous request number D1=3 with the request number $P_1$, and proceeds to step S33 in case of D1>P1. Since there exists a request $R_{10}$ (see FIG. 13) at the queue buffer 431__1 for the user level 1 (at steps S33 and S34), the thread controller 440 takes out the request $R_{10}$, prepares the thread to be transmitted to the target object TO__1 (at step S35), and returns to step S32 with the request number $P_1$ incremented by "1" i.e. $P_1$=1.

Similarly, the thread controller 440 sequentially takes out the requests $R_{11}$ and $R_{12}$ from the queue buffers 431__2 and 431__1, and prepares the thread to be transmitted to the target object TO__1. Since $D_1$(=3) is equal to or less than $P_1$(=3) when the thread controller 440 returns from step S35 to step S32, the transmission of the request for the user level 1 is made to the standby state. Then returning to step S31, the thread controller 440 starts taking out the requests from the queue buffers 431__3–431__5 for the user level 2 with i incremented by "1" i.e. i=2 and with $P_2$ initialized to "0".

Similarly, the thread controller 440 sequentially takes out seven requests $R_1$ $R_2$, $R_5$, $R_3$, $R_6$, $R_{13}$, and $R_4$ (see FIG. 13)

designated by the simultaneous request number $D_2$ from the queue buffers 431_3–431_5, prepares the threads to be transmitted to the target object TO_1, and assumes the standby state. It is to be noted that in the procedure shown in FIG. 16 such a procedure is omitted that the thread controller 440 sequentially takes out the requests from a plurality of queue buffers for the same user level.

As a result, three threads for the user level 1 and seven threads for the user level 2 are prepared, so that the target object TO_1 simultaneously processes ten requests in total. When the target object TO_1, for instance, completes the process of two requests for the user level 1, as shown in FIG. 15, ① two threads 500_1 for the user level 1 assume the standby state, and ② all of the threads 500_2 for the user level 2 still remain in an executing state.

Therefore, ③, ④ the thread controller 440 takes out the requests from the queue buffer 430_1 for the level 1 and starts to transmit them to the object TO_1 by using a vacant thread of the thread 500_1 for the user level 1. At this time, when there is no request buffered at the queue buffer 430_1, ⑤ the thread controller 440 takes out the requests from the queue buffer 430_2 for the user level 2, and does not transmit them by using the thread 500_1 for the user level 1. However, when there is a request buffered at the queue buffer 430_1 and the thread 500_2 includes the standby state, the thread controller 440 can give the request of the queue buffer 430_1 to the thread 500_2 for preparing the thread.

As a result, the thread controller 440 can give the requests to the target object according to the user level (high→low), and can equally process the requests having the same user level regardless of the users.

Figure 17A:
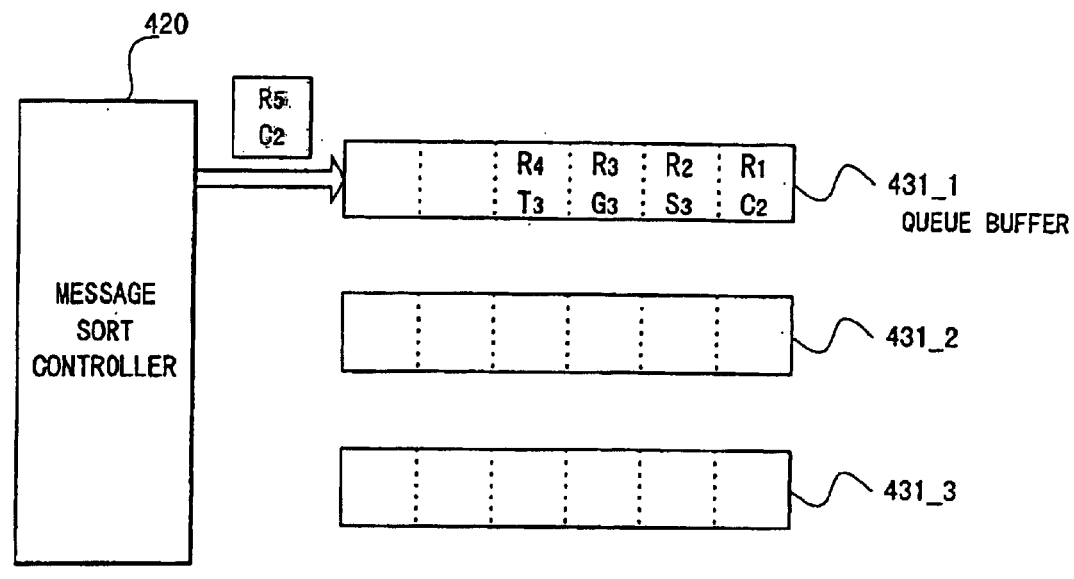
FIGS. 17A and 17B are block diagrams showing an operation example of a message sort controller in a message control apparatus according to the present invention.
Figure 17B:
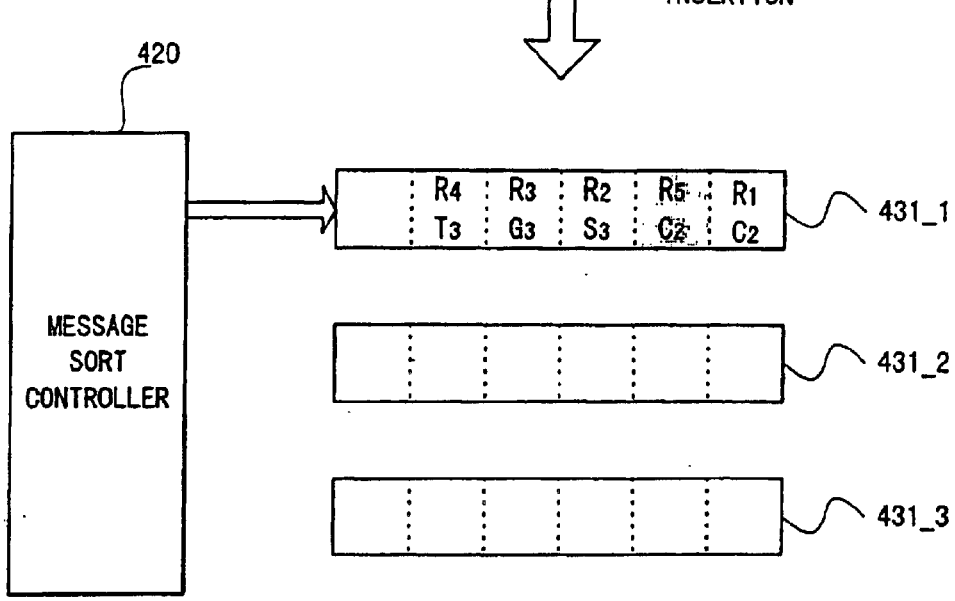

FIGS. 17A and 17B show an operation example of the message sort controller 420 (see FIG. 8). Also, in this operation example, the message managing portion 400 (see FIG. 8) is assumed to have read the user level and the priority level definition data shown in FIGS. 14A and 14B at the starting time.

In FIG. 17A, the requests $R_1, R_2, \ldots,$ and $R_4$ assume the standby state in this order at the queue buffer 431_1. The operation names of the requests $R_1$–$R_4$ are respectively "Create", "Set", "Get", and "Terminate". By referring to their priority level data of FIG. 15B which the message managing portion 400 has read, it is found that the priority levels of the operations are "2", "3", "3", and "3". These are respectively shown in FIGS. 17A and 17B by reference numerals "$C_2$", "$S_3$", "$G_3$", and "$T_3$".

Under this condition, receiving a request $R_5$ (Create), the message sort controller 420 recognizes that the priority level of "Create" is "2", and starts sorting since the priority level is higher than that of requests $R_2$–$R_4$. As shown in FIG. 17B, the message sort controller 420 rearranges the requests by inserting the request $R_5$ between the request $R_1$ and request $R_2$. As a result, the requests including the operation with a high priority level are preferentially given to the target object.

Figure 18:
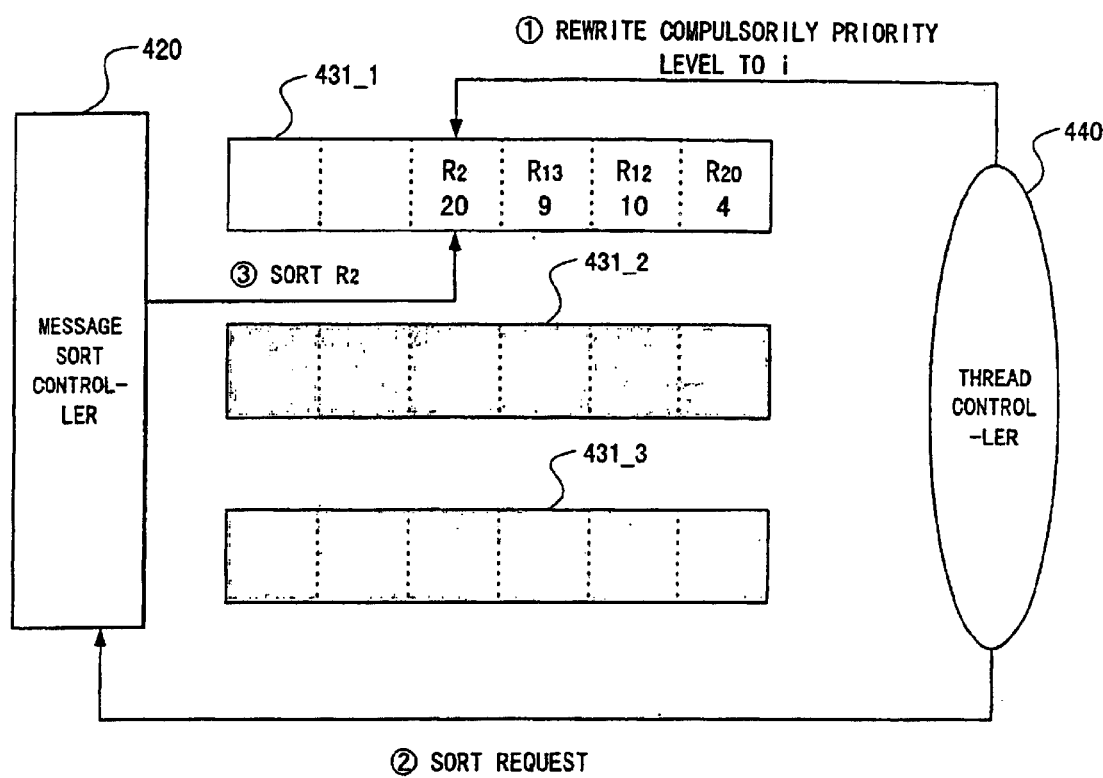
FIG. 18 is a block diagram showing an operation example of a message sort controller and a thread controller in a message control apparatus according to the present invention.

FIG. 18 shows an operation example of the message sort controller 420 and the thread controller 440 (see FIG. 8). When the requests of the operation with a high priority level are sequentially sent, the transmission of the requests with a lower priority level is further delayed only by using the sorting operation of the message sort controller 420 shown in FIGS. 17A and 17B.

Therefore, in the operation example (2), time stamp information is given to each of the requests buffered at the queue buffer. The present time stamp information of the requests $R_{20}, R_{12}, R_{13},$ and $R_2$ buffered at the queue buffer 431_1 has "4", "10", "9", and "20", respectively.

Every time the thread controller 440 takes out the requests from the queue buffers 431_1–431_3, the thread controller 440 increments the time stamp information of each of the requests $R_{20}$–$R_2$ by "1", and searches for the requests whose time stamp information has a predetermined value, e.g. more than "21". In this example, ① the thread controller 440 detects the request $R_2$ and compulsorily sets the priority level to "1", and ② the thread controller 440 requires the sort for the message sort controller 420.

Furthermore, ③ the message sort controller 420 sorts the requests $R_{20}$–$R_2$ in the order of the priority levels. As a result, the request $R_2$ with a higher priority level will be inserted before the request $R_{20}$, so that the request $R_2$ which has been kept waiting for more than a predetermined time is preferentially transmitted to the target object TO_1.

Figure 19:
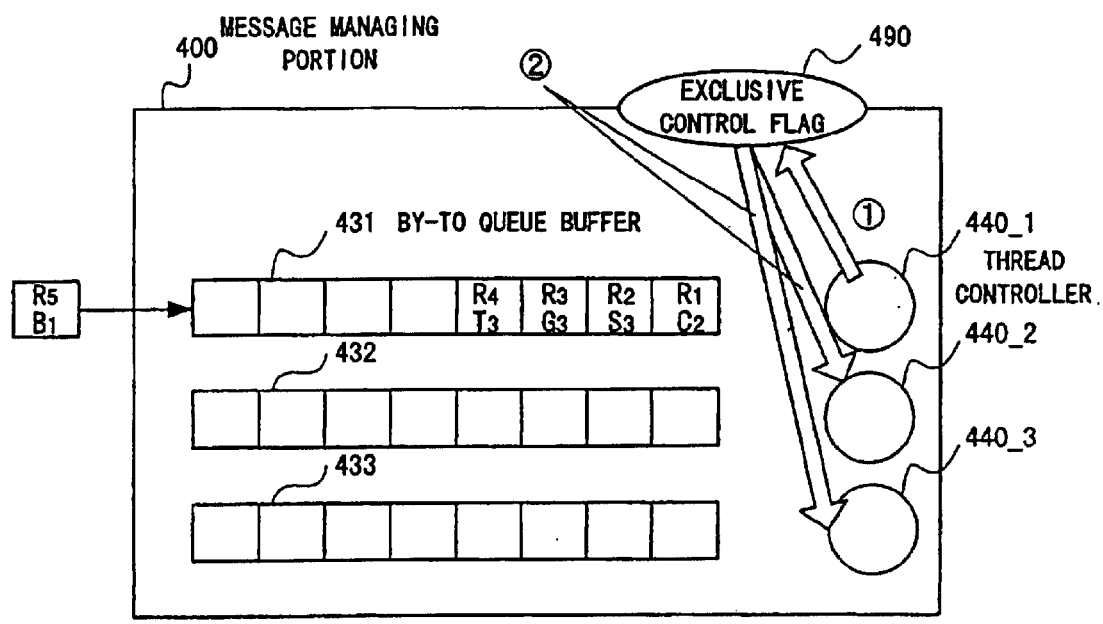
FIG. 19 is a block diagram showing an operation example (2) of a thread controller in a message control apparatus according to the present invention.
Figure 20:
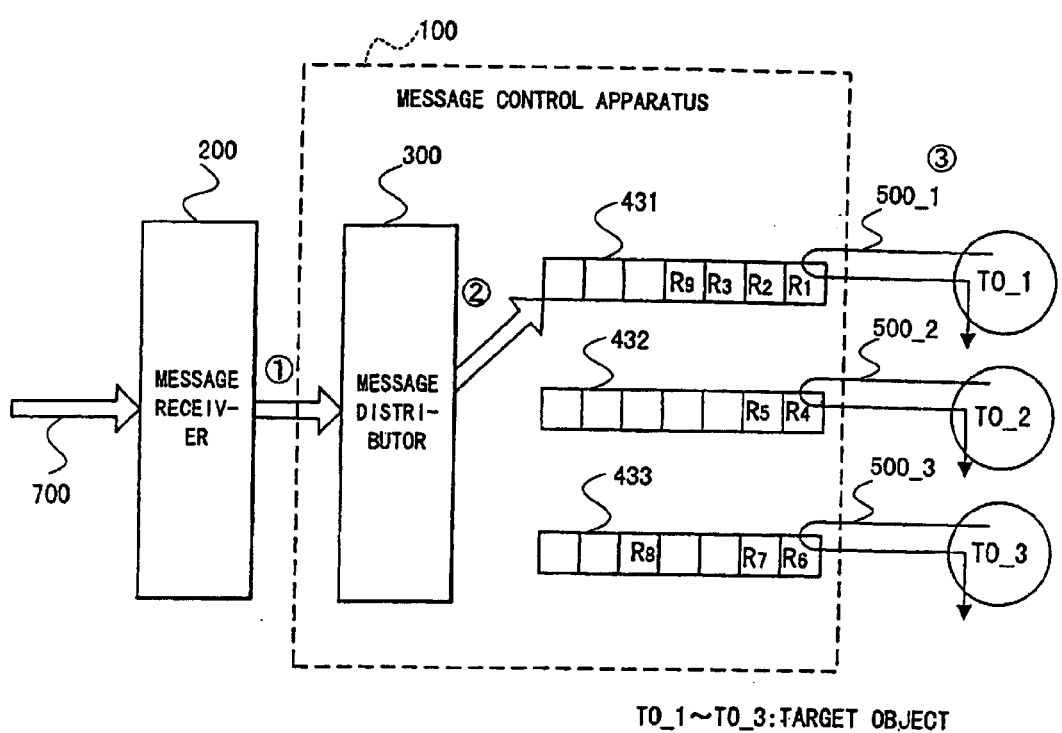
FIG. 20 is a block diagram showing an arrangement (1) of a conventional message control apparatus.
Figure 21:
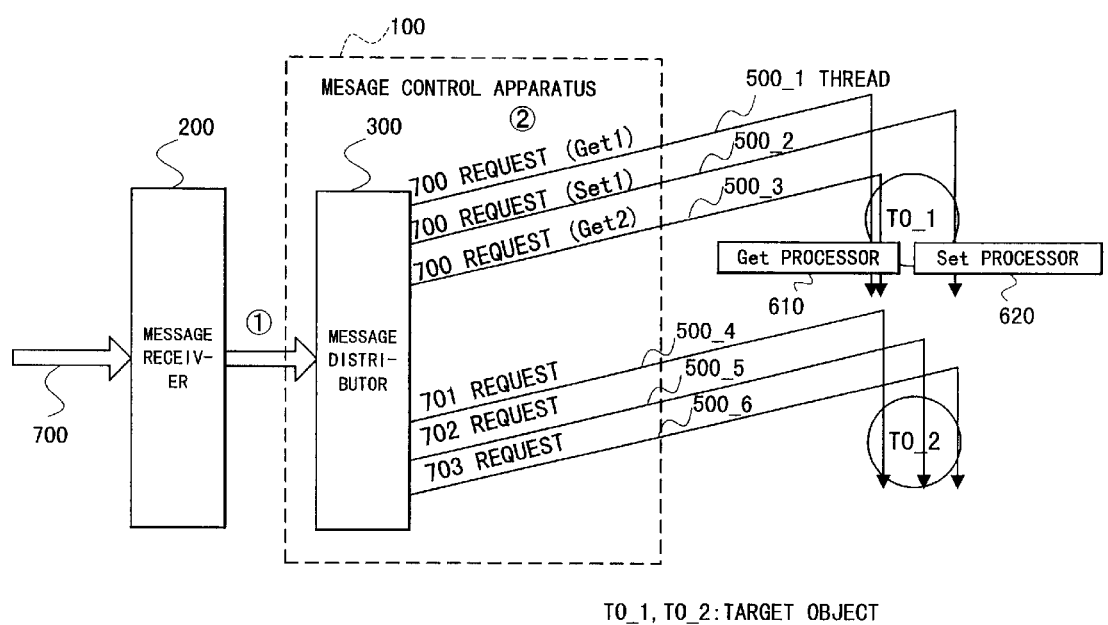
FIG. 21 is a block diagram showing an arrangement (2) of a conventional message control apparatus.

FIG. 19 shows an operation example (2) of the thread controller 440 (see FIG. 8). In this operation example, the message managing portion 400 has an exclusive control flag 490, so that each of the requests has the exclusive control information. Namely, the thread controller 440 can recognize an on/off state of the exclusive control information corresponding to the operation of each request by referring to the priority level definition information (see FIG. 14B) which the message managing portion 400 reads. Also, in the operation example, as shown in FIGS. 17A and 17B, the message sort controller 420 sorts the inputted requests according to the priority level of the operation.

In FIG. 19, the requests $R_1$ ($C_2$), $R_2$ ($S_3$), $R_3$ ($G_3$), and $R_4$ ($T_3$) are assumed to be buffered at a by-TO queue buffer 431 in the same way as the queue buffer 431_1 in FIGS. 17A and 17B. Their priority levels are, as mentioned above, "2", "3", "3" and "3", and all of their exclusive control information are "off" (see FIG. 14B).

For instance, when the request $R_5$ (Back_Up) is inputted to the message sort controller 420, the message sort controller 420 recognizes that the priority level of the request $R_5$ is "1" (see FIG. 14B), and sorts the requests so that the request $R_5$ is inserted before the request $R_1$.

The thread controller 440_1 takes out the request $R_5$ and prepares the thread to be transmitted. At this time, recognizing that the exclusive control information of the operation "Back_Up" of the request $R_5$ is "on" (see FIG. 14B), the thread controller 440_1 sets the exclusive control flag 490. While this exclusive control flag 490 is set, all of the thread controllers 440_1–440_3 take out only the requests to which the exclusive control information is set to be transmitted.

As a result, it becomes possible to transmit only specific requests with a higher priority level to the target object with a top priority.

As described above, a message control apparatus according to the present invention is arranged such that a message distributor distributes messages to queue buffers provided for each of target objects, and a thread controller simultaneously prepares a plurality of threads less than a maximum thread allocation number predetermined for each of processes and the target objects and takes out the messages to be given to a corresponding target object. Therefore, it becomes possible to increase the process speed of the whole system.

Also, the message control apparatus according to the present invention can be arranged such that the maximum thread allocation number corresponding to a CPU serviceability ratio in the processes is designated, and a part of the thread allocation number of the target objects with a few used thread number can be allotted to the maximum thread allocation number of the target objects with many used thread number. Therefore, it becomes possible to improve the process efficiency by decreasing an overhead which is caused by a CPU being loaded with excessive threads.

Furthermore, by setting levels for each process, priority levels for each operation of the messages, and exclusive control flags, it becomes possible to preferentially give specific messages to the target objects.

What we claim is:

1. A message control apparatus for transferring messages between objects which belong to different processes comprises:
   a plurality of queue buffers, each of the plurality of queue buffers being provided for one of a plurality of target objects;
   a message distributor for distributing the messages to the queue buffers corresponding to the target objects; and
   a thread controller for taking out the messages from the queue buffers to simultaneously prepare a plurality of threads to be given to a corresponding target object, the thread controller including a thread managing table for managing:
      a maximum thread allocation number of the messages that all of the threads inside each process can process; and
      a present process message number, and
   the thread controller assuming a standby state without taking out the messages when the present process message number exceeds the maximum thread allocation number.

2. A message control apparatus for transferring messages between objects which belong to different processes comprises:
   a plurality of queue buffers, each of the plurality of queue buffers being provided for one of a plurality of target objects;
   a message distributor for distributing the messages to the queue buffers corresponding to the target object; and
   a thread controller for taking out the messages from the queue buffers to simultaneously prepare a plurality of threads to be given to a corresponding target object,
   the thread controller including a thread managing table for managing per target object:
      a maximum thread allocation number that allows the messages to be given to the target objects, and
      a present process message number, and
   the thread controller assuming a standby state without taking out the messages of the corresponding target object when the present process message number exceeds the maximum thread allocation number.

3. The message control apparatus as claimed in claim 1, further comprising a thread allocation controller including a thread allocation managing table for holding the maximum thread allocation number corresponding to a CPU serviceability ratio in the process, and
   the thread allocation controller monitoring the CPU serviceability ratio at predetermined time intervals and designating the maximum thread allocation number corresponding to the CPU serviceability ratio in the thread allocation managing table as the maximum thread allocation number for the thread managing table.

4. The message control apparatus as claimed in claim 2, further comprising a message managing portion, that manages the queue buffer and the thread controller, for checking the present process message number at predetermined time intervals and for allotting a part of the maximum thread allocation number of the thread managing table having a smaller present process message number to the maximum thread allocation number of the thread managing table of another target object having a larger present process message number.

5. The message control apparatus as claimed in claim 1 wherein priority levels are respectively set for transmitting source processes, the queue buffer is provided for each priority level, the thread controller includes a first thread portion allotted only to the messages with a high priority level and a second thread portion allotted to the other messages, and when the second thread portion is occupied only the messages with the high priority level are allotted to the first thread portion.

6. The message control apparatus as claimed in claim 1 wherein priority levels are respectively set for transmitting source processes, the queue buffer is provided for each priority level, and the thread controller preferentially takes out the messages from the queue buffer with the high priority level.

7. The message control apparatus as claimed in claim 1 wherein the queue buffer is further provided for each transmitting source process.

8. The message control apparatus as claimed in claim 1 wherein priority levels are respectively set for operations included in the messages, and a message sort controller is further provided for arranging the messages in the order of the priority level.

9. The message control apparatus as claimed in claim 1 wherein time stamps are allotted to the messages and the thread controller preferentially takes out the messages whose time stamps indicate that a fixed time has elapsed.

10. The message control apparatus as claimed in claim 1 wherein an exclusive control flag is allotted to each process, the messages include exclusive control information, the thread controller sets the exclusive control flag when the control information is set, and all of the thread controllers take out only the messages to which the exclusive control information is set.

11. The message control apparatus as claimed in claim 1 wherein the messages comprise request messages.

12. The message control apparatus as claimed in claim 5 wherein the transmitting source process comprises a transmitting source object.

13. The message control apparatus as claimed in claim 2, further comprising a thread allocation controller including a thread allocation managing table for holding the maximum thread allocation number corresponding to a CPU serviceability ratio in the process, and
   the thread allocation controller monitoring the CPU serviceability ratio at predetermined time intervals and designating the maximum thread allocation number corresponding to the CPU serviceability ratio in the thread allocation managing table as the maximum thread allocation number for the thread managing table.

14. The message control apparatus as claimed in claim 2 wherein priority levels are respectively set for transmitting source processes, the queue buffer is provided for each priority level, the thread controller includes a first thread portion allotted only to the messages with a high priority level and a second thread portion allotted to the other messages, and when the second thread portion is occupied only the messages with the high priority level are allotted to the first thread portion.

15. The message control apparatus as claimed in claim 2 priority levels are respectively set for transmitting source processes, the queue buffer is provided for each priority level, and the thread controller preferentially takes out the messages from the queue buffer with the high priority level.

16. The message control apparatus as claimed in claim 2 wherein the queue buffer is further provided for each transmitting source process.

17. The message control apparatus as claimed in claim 2 wherein priority levels are respectively set for operations included in the messages, and a message sort controller is further provided for arranging the messages in the order of the priority level.

18. The message control apparatus as claimed in claim 2 wherein time stamps are allotted to the messages and the thread controller preferentially takes out the messages whose time stamps indicate that a fixed time has elapsed.

19. The message control apparatus as claimed in claim 2 wherein an exclusive control flag is allotted to each process, the messages include exclusive control information, the thread controller sets the exclusive control flag when the control information is set to the messages as taken out, and all of the thread controllers take out only the messages to which the exclusive control information is set when the exclusive control flag is set.

20. The message control apparatus as claimed in claim 2 wherein the messages comprise request messages.

21. The message control apparatus as claimed in claim 14 wherein the transmitting source process comprises a transmitting source object.

22. The message control apparatus as claimed in claim 6 wherein the transmitting source process comprises a transmitting source object.

23. The message control apparatus as claimed in claim 7 wherein the transmitting source process comprises a transmitting source object.

24. The message control apparatus as claimed in claim 15 wherein the transmitting source process comprises a transmitting source object.

25. The message control apparatus as claimed in claim 16 wherein the transmitting source process comprises a transmitting source object.

* * * * *

UNITED STATES PATENT AND TRADEMARK OFFICE
CERTIFICATE OF CORRECTION

PATENT NO. : 6,848,107 B1  
DATED : January 25, 2005  
INVENTOR(S) : Niroaki Komine et al.

It is certified that error appears in the above-identified patent and that said Letters Patent is hereby corrected as shown below:

Title page,
Item [54], Title, replace "MESSAGE CONTROL APPARATUS" with -- SYSTEM FOR CONTROLLING MESSAGE TRANSFER BETWEEN OBJECTS HAVING A CONTROLLER THAT ASSUMES STANDBY STATE AND WITHOUT TAKING OUT EXCESS MESSAGES FROM A QUEUE --.
Item [56], References Cited, FOREIGN PATENT DOCUMENTS, delete second occurrence "JP     7-501163     2/1993".

Signed and Sealed this

Eighteenth Day of October, 2005

JON W. DUDAS
*Director of the United States Patent and Trademark Office*

UNITED STATES PATENT AND TRADEMARK OFFICE
CERTIFICATE OF CORRECTION

PATENT NO.       : 6,848,107 B1
APPLICATION NO.  : 09/328369
DATED            : January 25, 2005
INVENTOR(S)      : Hiroaki Komine et al.

It is certified that error appears in the above-identified patent and that said Letters Patent is hereby corrected as shown below:

Title page
On Certificate of Correction dated October 18, 2005, under "Inventor(s)" Item [75] change "Niroaki Komine et al." to --Hiroaki Komine et al.--

Signed and Sealed this

Twentieth Day of February, 2007

JON W. DUDAS
*Director of the United States Patent and Trademark Office*